US005821841A

United States Patent [19]

Furlani et al.

[11] Patent Number: 5,821,841

[45] Date of Patent: Oct. 13, 1998

[54] MICROCERAMIC LINEAR ACTUATOR

[75] Inventors: Edward P. Furlani, Lancaster; Dilip K. Chatterjee; Syamal K. Ghosh, both of Rochester, all of N.Y.

[73] Assignee: Eastman Kodak Company, Rochester, N.Y.

[21] Appl. No.: 820,064

[22] Filed: Mar. 18, 1997

[51] Int. Cl.[6] ................................ H01F 7/00; H01F 7/08; H01F 7/06; B29C 43/22

[52] U.S. Cl. .......................... 335/229; 335/230; 335/234; 335/255; 335/260; 335/282; 29/602.1; 29/606; 29/607; 29/608; 264/272.19; 264/272.2

[58] Field of Search .................................... 29/602.1, 606, 29/607, 608; 264/272.19, 272.2; 335/229, 230, 234, 255, 256, 260, 266, 282

[56] References Cited

U.S. PATENT DOCUMENTS

| | | | |
|---|---|---|---|
| 4,494,098 | 1/1985 | Haneda et al. | 335/230 |
| 5,434,549 | 7/1995 | Hirabayashi et al. | 335/229 |

*Primary Examiner*—Michael L. Gellner
*Assistant Examiner*—Raymond Barrera
*Attorney, Agent, or Firm*—Raymond L. Owens

[57] ABSTRACT

A microceramic linear actuator includes a unitary ceramic body which has been formed with an internal cavity; a piston mounted for linear movement within the internal cavity and having a micromagnet with first and second poles of opposite polarity, and at least one shaft attached to the micromagnet; a conductive coil embedded in the unitary ceramic body and having a first portion wound in a clockwise direction and disposed in operative relationship to the first pole of the micromagnet, and a second portion wound in a counterclockwise direction and disposed in operative relationship to the second pole of the micromagnet. A power supply applies current in first and second directions to the coil such that when the current is applied in the first direction it flows through both coil portions, and the clockwise portion of the coil imparts a force to the first pole of the micromagnet, and the counterclockwise portion of the coil imparts a force to the second pole of the micromagnet thereby causing such micromagnet and its attached shaft to move in the first linear direction, and when it is applied in a second direction the clockwise portion of the coil imparts an opposite force to the first pole of the micromagnet, and the counterclockwise portion of the coil imparts an opposite force to the second pole of the micromagnet thereby causing such micromagnet and its attached shaft to move in a second linear direction.

21 Claims, 5 Drawing Sheets

MICROCERAMIC LINEAR ACTUATOR

FIELD OF THE INVENTION

The present invention relates to electromechanical actuators in general, and more particularly linear actuators for motion and control applications.

BACKGROUND OF THE INVENTION

Electromechanical linear actuators are well known in the art and have been used in a number of motion and control applications. It is, of course, highly advantageous to miniaturize such actuators. Conventional linear actuators are typically greater that 1 cubic centimeter in volume. The materials and methods for the fabrication of these actuators are inadequate for the fabrication of microelectromechanical linear actuators which are less than 1 cubic centimeter in volume.

SUMMARY OF THE INVENTION

It is an object of the present invention to provide miniaturized linear actuators which are less than 1 cubic centimeter in volume.

This object is achieved in a microceramic linear actuator comprising:

(a) a unitary ceramic body which has been formed with an internal cavity;

(b) a piston mounted for linear movement within the internal cavity and having a micromagnet with first and second poles of opposite polarity, and at least one shaft attached to the micromagnet;

(c) a conductive coil embedded in the unitary ceramic body and having a first portion wound in a clockwise direction and disposed in operative relationship to the first pole of the micromagnet, and a second portion wound in a counterclockwise direction and disposed in operative relationship to the second pole of the micromagnet; and (d) means for applying current in first and second directions to the coil such that when the current is applied in the first direction it flows through both coil portions, and the clockwise portion of the coil imparts a force to the first pole of the micromagnet, and the counterclockwise portion of the coil imparts a force to the second pole of the micromagnet thereby causing such micromagnet and its attached shaft to move in the first linear direction, and when it is applied in a second direction the clockwise portion of the coil imparts an opposite force to the first pole of the micromagnet, and the counterclockwise portion of the coil imparts an opposite force to the second pole of the micromagnet thereby causing such micromagnet and its attached shaft to move in a second linear direction.

It is a feature of the present invention that miniaturized linear actuators can be fabricated using micromolded ceramic technology.

Microceramic linear actuators have a number of advantages; they can withstand harsh corrosive or high temperature environments. Another feature of this invention is that by using micromolded ceramic technology, linear actuators can be made in high volume with high yields at reduced cost.

DETAILED DESCRIPTION OF THE PREFERRED EMBODIMENTS

Figure 1:
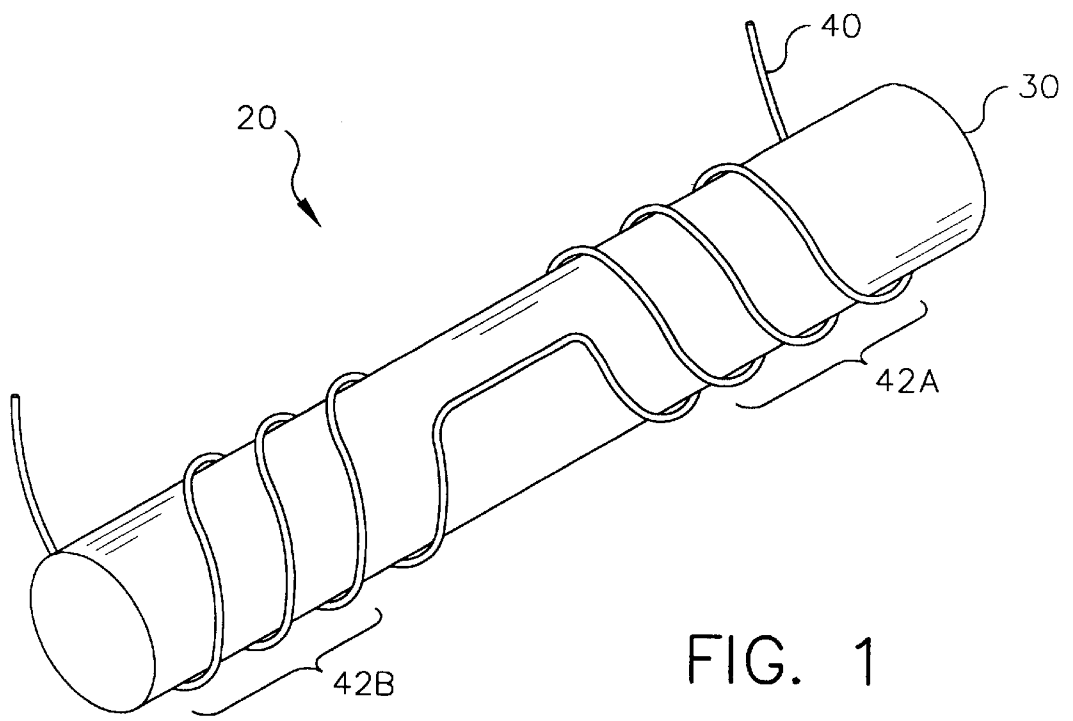
FIG. 1 is a perspective of an insert comprising a sintered ceramic bar and a sacrificial fiber having portions wound in clockwise and counterclockwise directions in a helical fashion on the surface of the sintered ceramic bar.

Referring to FIG. 1, a perspective is shown of an insert 20 comprising a sintered ceramic bar 30 and a sacrificial fiber 40 having portions 42A and 42B wound in clockwise and counterclockwise directions, respectively, in a helical fashion on the surface of the sintered ceramic bar 30. The sacrificial fiber 40 is on the order of 100 microns in diameter or less and is made from refractory materials such as tungsten (W), molybdemum (Mo), or Tantalum (Ta).

Figure 2:
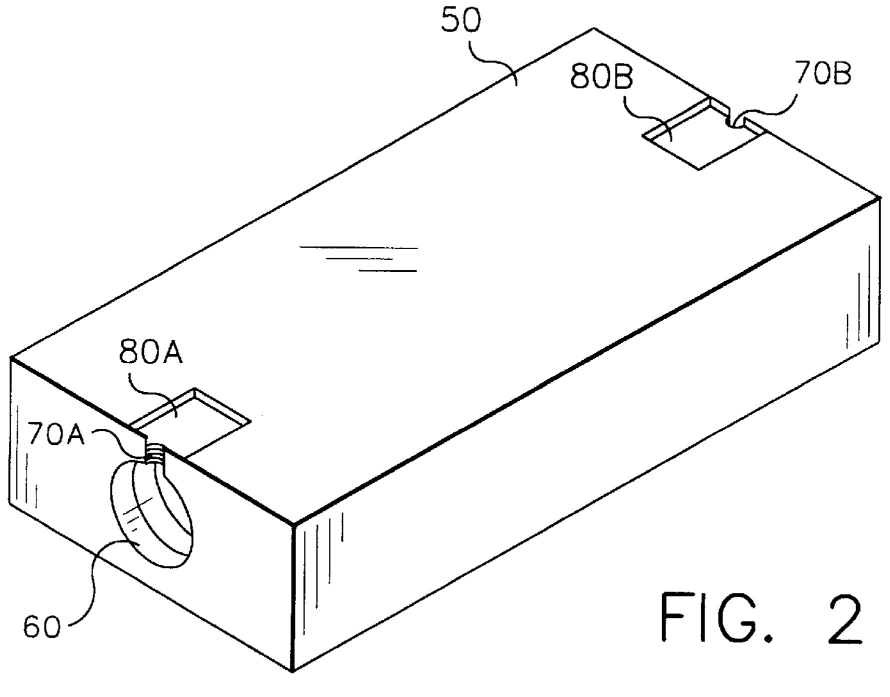
FIG. 2 is a perspective of a micromolded ceramic block in the green state with grooved paths, recesses, and a cavity for receiving the insert shown in FIG. 1.

Referring to FIG. 2 a perspective is illustrated of a rectangular micromolded ceramic block 50 in the green state, with a cavity 60 for receiving insert 20, and grooved paths 70A and 70B leading from the ends of the cavity to recesses 80A and 80B on the surface of micromolded ceramic block 50. The dimensions of the micromolded ceramic block 50 are such that the volume that it occupies is on the order of 1 cubic mm or less. In this document, the term green state refers to a compacted ceramic body comprising ceramic powder with (or without) organic binders. The ceramic powder could be dry or in a state of slurry mixed with organic binders. The ceramic powder should preferably be selected from the following materials: alumina, titania, zirconia, or alumina-zirconia composites.

Figure 3A:
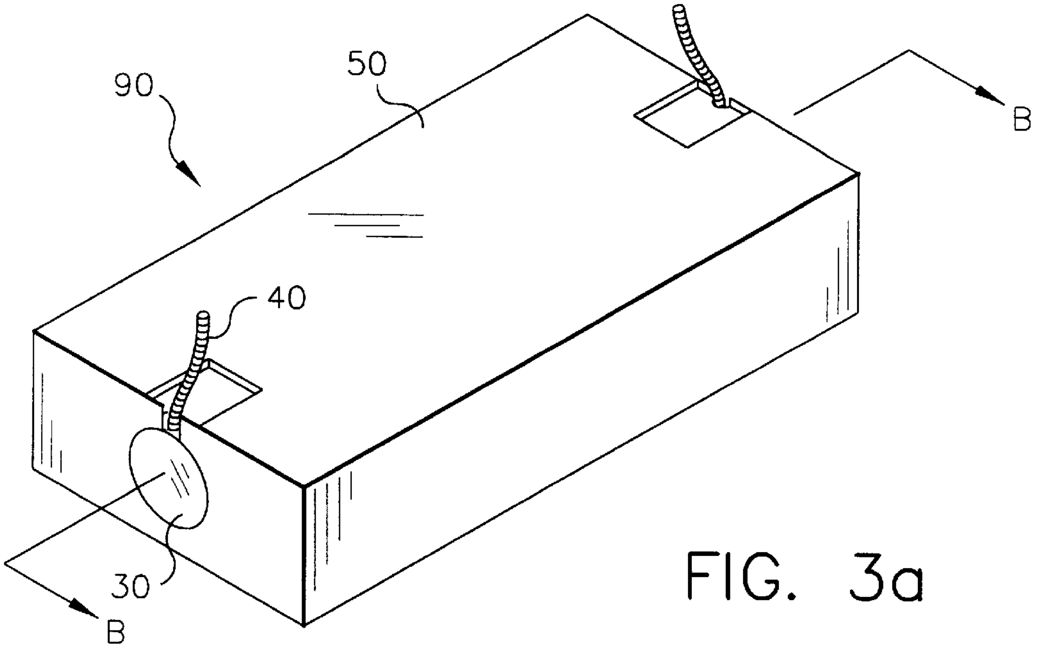
FIG. 3*a* is a perspective of the micromolded ceramic block with the insert of FIG. 1 embedded its cavity.
Figure 3B:
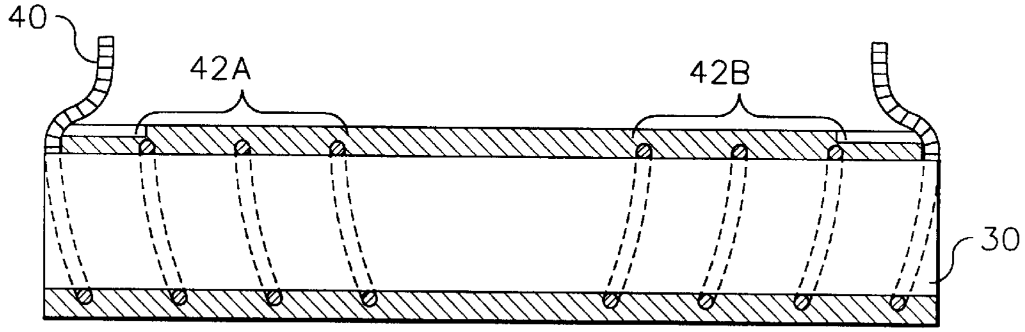
FIG. 3*b* is a cross-sectional view of the device in FIG. 3*a* taken along line B—B of FIG. 3*a*.

Referring to FIG. 3*a*, the insert 20 is inserted into the cavity 60 of micromolded ceramic block 50, with the first and second terminal ends of the sacrificial fiber 40 fixed in the first and second recess 80*a* and 80*b*. After this assembly, the entire structure is sintered to form a unitary ceramic structure 90. It is instructive to note that the cavity 60 is large enough to accommodate the insert 20 with additional space to allow for 22% shrinkage of the cavity 60 which occurs during sintering, so as to preclude fracturing of the micromolded block 50 during sintering. Referring to FIG. 3*b*, a cross-sectional view of unitary ceramic structure 90 along line B—B of FIG. 3*a* is shown, illustrating the embedded portions 42A and 42B of sacrificial fiber 40.

Figure 4:
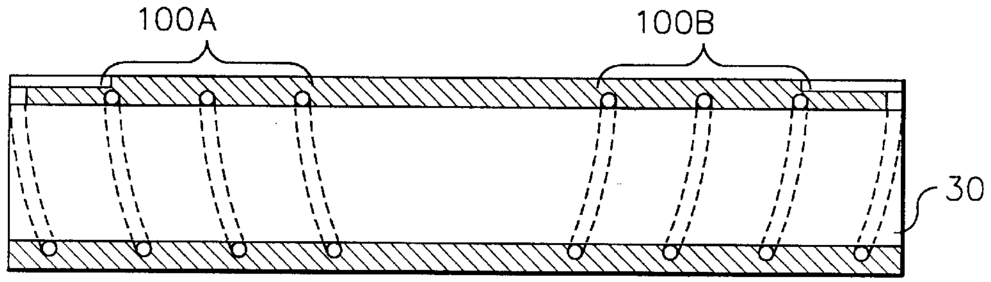
FIG. 4 is a cross-sectional view of the device in FIG. 3*a* taken along line B—B of FIG. 3*a* after a sintering and etching process in which the sacrificial fiber has been etched away leaving behind an embedded coil receiving cavity.

Referring to FIG. 4, a cross-sectional perspective is shown of unitary ceramic structure 90 taken along line B—B of FIG. 3*a* after sintering and etching. During the etching process, the sacrificial fiber 40 is etched away leaving an embedded coil receiving cavity having clockwise and counterclockwise wound portions 100A and 100B, respectively. The sacrificial fiber 40 is etched away using Ammonium Hydroxide $NH_4OH$ or Hydrocloric acid leaving an embedded coil receiving cavity in its place.

Figure 5:
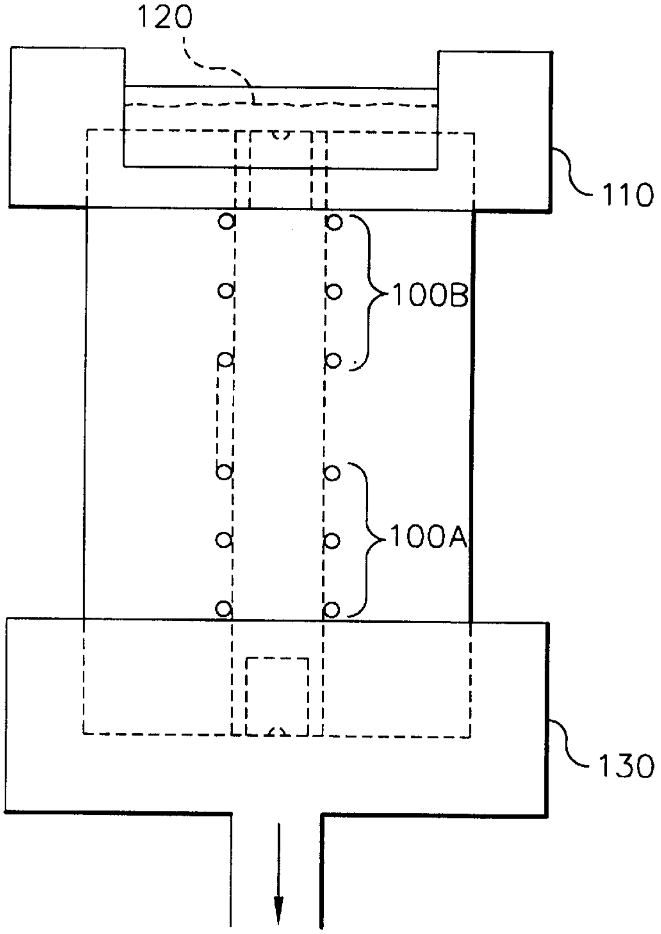
FIG. 5*a* is a view of the device in FIG. 4 in an intermediate step of fabrication in which the etched embedded coil receiving cavity is being filled with conductive material.

Referring to FIG. 5, unitary ceramic structure 90 with etched embedded coil receiving cavity is shown mounted in a vertical fashion with its top portion surrounded on all sides by a nonporous containment structure 110 (dam) which is filled with a molten pool of conductive metal alloy 120 such as Au, Ag, Ag-Cu, or Cu-Sn or alternatively a thin film conductive paste. The bottom of the device is in a vacuum chamber 130 which is continually pumped so as to draw the molten alloy through the embedded coil receiving cavity. In this way, highly conductive metal is made to fill the embedded coil receiving cavity thereby forming an embedded conductive helical coil 140 with clockwise and counterclockwise wound portions 142A and 142B, respectively (not shown, see FIG. 7*b*). The conductive metal also fills grooved paths 70A and 70B (not shown, see FIG. 2) forming conductive connections 205A and 205B (not shown, see FIG. 7*b*), and it fills recesses 80A and 80B (not shown, see FIG. 2) forming conductive pads 210A and 210B (not shown, see FIG. 7*a*). Once the embedded conductive helical conductive helical coil 140 is formed, an internal cavity 145 (not shown, see FIG. 7*b*) is drilled through the unitary ceramic structure 90 which is concentric to the embedded conductive helical coil 140.

Figure 6:
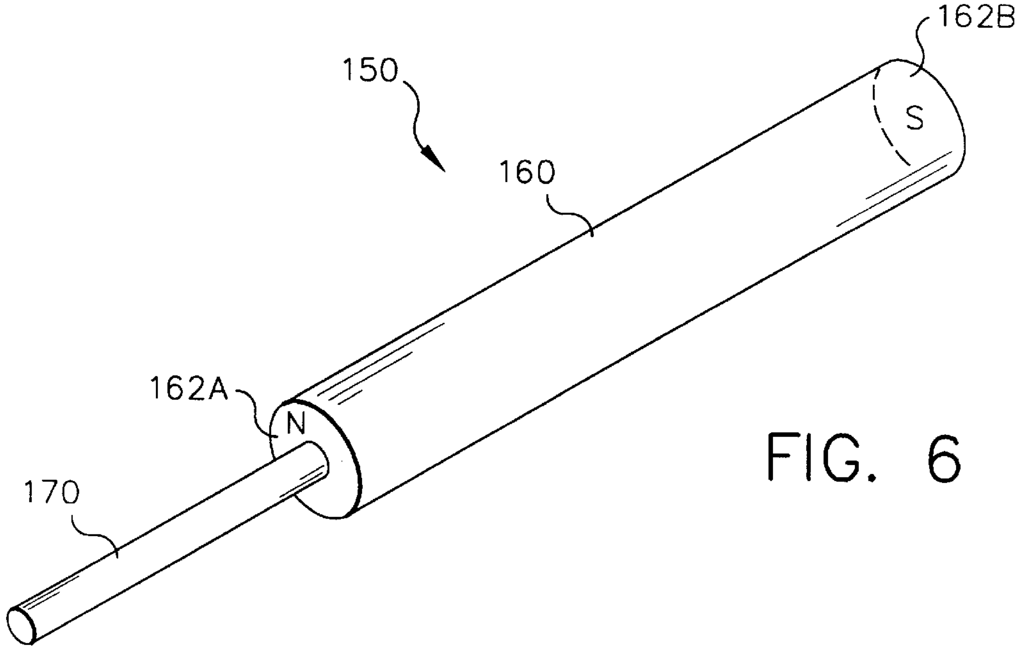
FIG. 6 is a perspective of a piston comprising a micromagnet with attached shaft.

Referring to FIG. 6 a perspective is shown of a piston 150 comprising a micromagnet 160 with an attached shaft 170. Micromagnet 160, having opposite poles, is made from a hard magnetic material such as neodymium-iron-boron, and is polarized along its axis with a north pole 162A and south pole 162B at its opposite ends as shown.

Figure 7A:
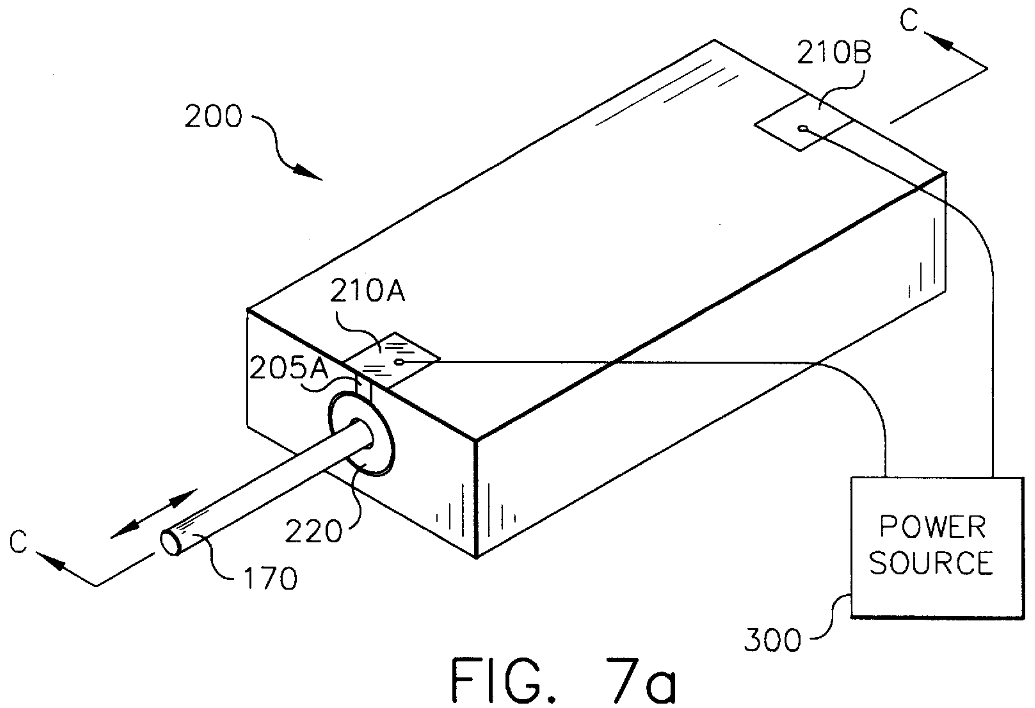
FIG. 7*a* is a perspective of an assembled linear actuator of the present invention with at power source.
Figure 7B:
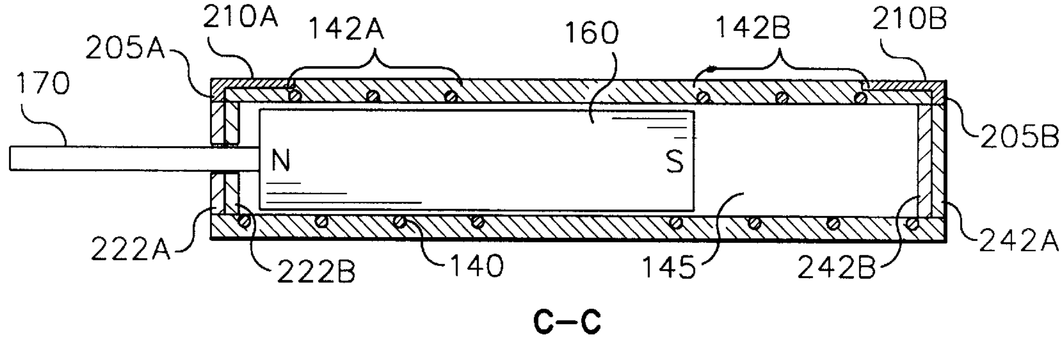
FIG. 7*b* is a cross-sectional view of the assembled actuator of FIG. 7*a* taken along line C—C.
Figure 7C:
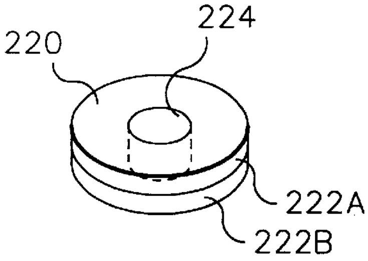
FIG. 7*c* is a perspective of a first end plug for the actuator in of FIG. 7*a*.
Figure 7D:
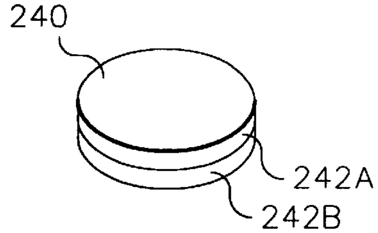
FIG. 7*d* is a perspective of a second end plug for the actuator in of FIG. 7*a*.

Referring to FIG. 7*a*, a perspective is shown of assembled linear actuator 200 in which piston 150 is inserted into internal cavity 145. An end plug 220, comprising portions 222A and 222B, and a through-hole 224 for receiving piston shaft 170, is shrunk fit into one end of internal cavity 145, and an end plug 240, comprising portions 242A and 242B, is shrunk fit into the opposite end of internal cavity 145 (see FIG. 7*b*). A power source 300 is connected to conductive pads 210A and 210B for supplying current to embedded conductive helical coil 140 to cause linear motion of piston 150 as will be described. Referring to FIG. 7*b*, a cross-sectional view of the assembled linear actuator 200 is shown taken along line C—C of FIG. 7*a*. Referring to FIG. 7*c*, a perspective of end plug 220 is shown. Referring to FIG. 7*d*, a perspective of end plug 240 is shown.

Figure 8A:
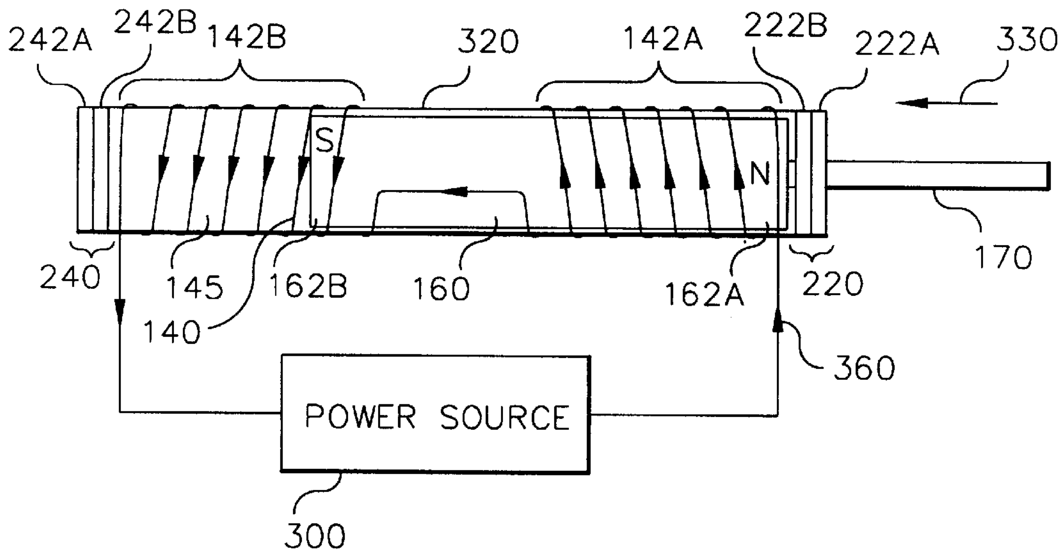
FIGS. 8*a* and 8*b* are schematic diagrams depicting of the operation of the linear actuator of the present invention.
Figure 8B:
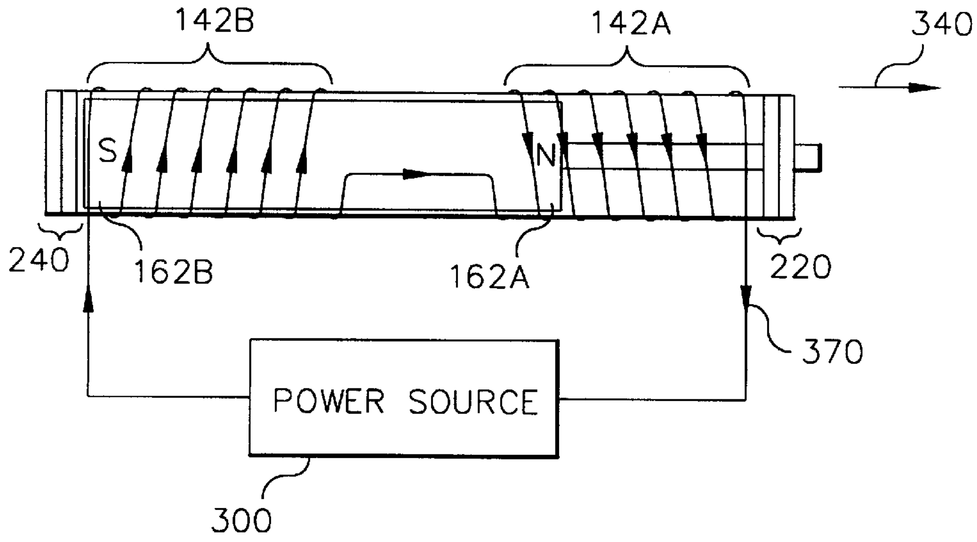

Referring to FIGS. 8*a*and 8*b*, schematics are shown illustrating the operation of assembled linear actuator 200 (shown in FIG. 7*a*). In FIG. 8*a*, a power source 300 is connected to a conductive helical coil 140 which is wound on the surface of the coil support member 320. A piston 150 (see FIG. 6), comprising a micromagnet 160, which is polarized along its axis with a north pole 162A at one end and a south pole 162B at its opposite end, and having an attached shaft 170, is inserted into coil support member 320 as shown. The conductive helical coil 140 is formed with a clockwise wound portion 142A in operative relation to the north pole 162A of micromagnet 160, and a counterclockwise wound portion 142B in operative relation to the south pole 162B of micromagnet 160. End plug 240, which comprises first and second portions 242A and 242B, is fixedly attached to a first end of coil support member 320 thereby limiting the range of linear motion of piston 150 in a first direction indicated by arrow 330. End plug 220, which comprises first and second portions 222A and 222B, and having a through-hole 224 for receiving shaft 170 therethrough, is fixedly attached to a second end of coil support member 320 thereby limiting the range of linear motion of piston 150 in a second direction indicated by arrow 340 in FIG. 8*b*.

Referring now to FIG. 8*a*, the piston 150 is shown in a first end position in which the north pole 162A of micromagnet 160 abuts end portion 222B of end plug 220. To move the piston 150 in the first linear direction indicated by arrow 330, power source 300 supplies current to conductive helical coil 140 in a first direction as indicated by arrow 360. The current passes through the clockwise wound portion 142A and counter clockwise portion 142B of conductive helical coil 140 and gives rise to a magnetic field substantially along the axis of conductive helical coil 140 that imparts a Lorentz force acting in the first linear direction to the north pole 162A, and south pole 162B, respectively, of micromagnet 160 as is well known. Thus the micromagnet 160, and hence the piston 150, moves in the first linear direction in response to the current in conductive helical coil 140 and comes to rest in a second end position shown in FIG. 8*b*.

Referring now to FIG. 8*b*, the piston 150 is shown in a second end position in which the south pole 162B of micromagnet 160 abuts end portion 242B of end plug 240. To move the piston 150 in the second linear direction indicated by arrow 340, power source 300 supplies current to conductive helical coil 140 in a first direction as indicated by arrow 370. The current passes through the clockwise wound portion 142A and counter clockwise portion 142B of conductive helical coil 140 and gives rise to a magnetic field substantially along the axis of conductive helical coil 140 that imparts a Lorentz force acting in the second linear direction to the north pole 162A, and south pole 162B, respectively, of micromagnet 160. Thus the micromagnet 160, and hence the piston 150, moves in the second linear direction in response to the current in conductive helical coil 140 and comes to rest in a first end position shown in FIG. 8*a*.

It the preferred embodiment, end plugs 220 and 240 are comprised of ferromagnetic portions 222A and 242A, respectively, and nonferromagnetic portions 222B and 242B, respectively. The ferromagnetic portions 222A and 242A dominantly attract the north pole 162A and south pole 162B of micromagnet 160, respectively, thereby providing a force on the piston that tends to hold it in its first and second end positions, respectively, as shown in FIGS. 8*a* and 8*b*. The ferromagnetic portions 222A and 242A are made from a soft magnetic material such permalloy, supermalloy, sendust, iron, nickel, nickel-iron or alloys thereof. Alternatively, ferromagnetic portions 222A and 242A can be made from hard magnetic materials such as neodymium-iron-boron and polarized in such a way so as to attract the north pole 162A and south pole 162B of micromagnet 160, respectively, as is well known. The nonferromagnetic portions 222B and 242B function to provide separation between the ferromagnetic portions 222A and 242A, and the north pole 162A and south pole 162B of micromagnet 160, respectively, when its in its first and second end positions, respectively, thereby enabling movement of the piston 150 from its first to second end positions with reduced current. For example, to move the piston 150 from the first to second end positions, the current through the conductive helical coil 140 must be of sufficient magnitude to overcome the holding force provided by the ferromagnetic portion 222A of the end plug 220 when the piston 150 is in the first end position. This holding force decreases with increased separation between the north pole 162A of micromagnet 160 and the ferromagnetic portion 222A, and consequently, the presence of the nonferromagnetic portion 222A reduces the holding force and hence the current required to overcome it.

It is instructive to note that both end plugs 220 and 240 can be made from nonferromagnetic material such as glass, plastic or nonmagnetic metals, and the function of the linear actuator will be as described above except that the end plugs 220 and 240 will not impart a force to micromagnet 160 and therefore will not provide forces to hold the piston 160 in the first and second end positions. Alternatively, end plug 220, or portions thereof, can be made from a ferromagnetic material and end plug 240 can be made from a nonferromagnetic material thereby providing a holding force on the piston when its in its first end position but not when its second end position; or end plug 220 can be made from a nonferromagnetic material and end plug 240, or potions thereof, can be made from a ferromagnetic material thereby providing a holding force on the piston when its in its second end position but not when its in its first end position.

The invention has been described in detail with particular reference to certain preferred embodiments thereof, but it will be understood that variations and modifications can be effected within the spirit and scope of the invention.

PARTS LIST

20 insert
30 bar
40 sacrificial fiber
42A clockwise wound portion of sacrificial fiber
42B counterclockwise wound portion of sacrificial fiber
50 ceramic block
60 cavity
70A grooved path
70B grooved path
80A recess
80B recess
90 unitary ceramic structure
100A clockwise wound portion of embedded coil receiving cavity
100B counterclockwise wound portion of embedded coil receiving cavity
110 nonporous containment structure
120 molten pool of conductive alloy
130 vacuum chamber
140 embedded conductive helical coil
142A clockwise wound portion of embedded coil
142B counterclockwise wound portion of embedded coil
145 internal cavity
150 piston
160 micromagnet
162A north pole
162B south pole
170 shaft
200 assembled linear actuator
205A conductive connection
205B conductive connection
Parts List cont'd
210A conductive pad
210B conductive pad
220 end plug with a through-hole
222A portion of end plug
222B portion of end plug
224 through-hole
240 end plug
242A portion of end plug
242B portion of end plug
300 power source
320 coil support member
330 first direction arrow
340 second direction arrow
360 first current direction arrow
370 second current direction arrow

What is claimed is:

1. A microceramic linear actuator comprising:

(a) a unitary ceramic body which has been formed with an internal cavity;

(b) a piston mounted for linear movement within the internal cavity and having a micromagnet with first and second poles of opposite polarity, and at least one shaft attached to the micromagnet;

(c) a conductive coil embedded in the unitary ceramic body and having a first portion wound in a clockwise direction and disposed in operative relationship to the first pole of the micromagnet, and a second portion wound in a counterclockwise direction and disposed in operative relationship to the second pole of the micromagnet; and (d) means for applying current in first and second directions to the coil such that when the current is applied in the first direction it flows through both coil portions, and the clockwise portion of the coil imparts a force to the first pole of the micromagnet, and the counterclockwise portion of the coil imparts a force to the second pole of the micromagnet thereby causing such micromagnet and its attached shaft to move in the first linear direction, and when it is applied in a second direction the clockwise portion of the coil imparts an opposite force to the first pole of the micromagnet, and the counterclockwise portion of the coil imparts an opposite force to the second pole of the micromagnet thereby causing such micromagnet and its attached shaft to move in a second linear direction.

2. The microceramic linear actuator according to claim 1 further including means for limiting the range of linear motion of said piston.

3. The microceramic linear actuator according to claim 2 wherein the linear motion limiting means include a first and second end plug, wherein the first end plug has a hole therethrough for receiving said shaft and for permitting the motion of piston with attached shaft to move in a first and second linear directions.

4. The microceramic linear actuator according to claim 3 wherein the first and second end plugs are formed from nonferromagnetic materials.

5. The microceramic linear actuator according to claim 3 wherein the first and second end plugs are formed from a ferromagnetic material.

6. The microceramic linear actuator according to claim 5 wherein the ferromagnetic material is a soft magnetic material.

7. The microceramic linear actuator according to claim 5 wherein the ferromagnetic material is a hard magnetic material.

8. The microceramic linear actuator according to claim 3 wherein both the first and second end plugs further comprise first and a second portions wherein said first portion is made from a nonferromagnetic material and is in closer proximity to said piston than said second portion which is made from a ferromagnetic material.

9. The microceramic linear actuator according to claim 3 wherein the first end plug is made from a nonferromagnetic material and the second end plug is made from a ferromagnetic material.

10. The microceramic linear actuator according to claim 3 wherein the first end plug is made from a ferromagnetic material and the second end plug is made from a nonferromagnetic material.

11. A method for making a microceramic linear actuator, comprising the steps of:

(a) forming an insert comprising a sintered ceramic bar with a sacrificial fiber wound in a helical fashion on its surface, wherein the sacrificial fiber comprises a first and second end portion, and portions wound in clockwise and counterclockwise directions with respect to the surface of the ceramic bar;

(b) forming a micromolded ceramic block in the green state having a cavity therein for receiving said insert and with additional space to accommodate a 22% shrinkage of said ceramic block during sintering, and further having features that include a first and a second grooved path leading from the cavity to a first and second recess on the ceramic block, respectively;

(c) placing the insert into the cavity and placing the first and second end portions of the sacrificial fiber into the first and second grooved paths, respectively, with the first and second terminal ends of the sacrificial fiber fixed in the first and second recess, receptively;

(d) sintering such assembled structure to form a unitary ceramic body;

(e) etching away the sacrificial fiber to thereby provide an embedded coil receiving cavity;

(f) filling the embedded coil receiving cavity with a conductive material to form an embedded coil;

(g) removing the sintered ceramic bar from the unitary ceramic body to form an internal cavity therethrough;

(h) inserting a piston into the internal cavity so that it is mounted for linear movement within the internal cavity, wherein said piston further comprises a micromagnet with first and second poles of opposite polarity, and at least one shaft attached to the micromagnet;

(i) fixedly mounting a first end plug in one end of the internal cavity; wherein said first end plug has a hole therethrough for receiving said shaft and for permitting the motion of piston with attached shaft to move in a first and second linear direction; and (j) fixedly mounting a second end plug in the opposite end of the internal cavity.

12. The method of claim 11 wherein the green micromolded ceramic block is formed from alumina, titania, zirconia, or alumina-zirconia composites.

13. The method of claim 11 wherein said micromagnet is formed from a hard magnetic material.

14. The method of claim 11 wherein said embedded coil is formed from conductive metal alloys.

15. The method of claim 11 wherein the first and second end plugs are formed from nonferromagnetic materials.

16. The method of claim 11 wherein the first and second end plugs are formed from a ferromagnetic material.

17. The method of claim 16 wherein the ferromagnetic material is a soft magnetic material.

18. The method of claim 16 wherein the ferromagnetic material is a hard magnetic material.

19. The method of claim 11 wherein both the first and second end plug further comprise a first and second portion wherein said first portion is made from a nonferromagnetic material and is in closer proximity to said piston than said second portion which is made from a ferromagnetic material.

20. The method of claim 11 wherein the first end plug is made from a nonferromagnetic material and the second end plug is made from a ferromagnetic material.

21. The method of claim 11 wherein the first end plug is made from a ferromagnetic material and the second portion is made from a nonferromagnetic material.

* * * * *